United States Patent
Paternostre et al.

(10) Patent No.: US 7,448,162 B2
(45) Date of Patent: Nov. 11, 2008

(54) SYSTEM AND METHOD FOR DISPLAYING AND MARKETING INDOOR FLOWER BULBS

(76) Inventors: Lilian Paternostre, 43 P-38 Dr., Waynesboro, VA (US) 22980; Joep A. F. Paternostre, 43 P-38 Dr., Waynesboro, VA (US) 22980

( * ) Notice: Subject to any disclaimer, the term of this patent is extended or adjusted under 35 U.S.C. 154(b) by 89 days.

(21) Appl. No.: 11/361,805

(22) Filed: Feb. 24, 2006

(65) Prior Publication Data
US 2006/0242897 A1 Nov. 2, 2006

Related U.S. Application Data

(60) Provisional application No. 60/676,763, filed on May 2, 2005.

(51) Int. Cl.
*A01G 5/00* (2006.01)
*A01G 9/02* (2006.01)
*A47G 7/00* (2006.01)

(52) U.S. Cl. .............................. 47/47; 47/41.01; 47/44; 47/39; 47/79; 47/65.5; 206/423

(58) Field of Classification Search ...................... 47/39, 47/41.13, 71, 79, 84, 65.5, 41.01; 206/423
See application file for complete search history.

(56) References Cited

U.S. PATENT DOCUMENTS

| | | | | |
|---|---|---|---|---|
| 611,523 | A * | 9/1898 | Springer | 47/65.6 |
| 845,703 | A * | 1/1907 | Roberts | 108/24 |
| 1,499,165 | A * | 6/1924 | France | 47/63 |
| 1,959,510 | A * | 5/1934 | Van Waveren | 47/84 |
| 2,189,982 | A * | 2/1940 | Gustaf | 47/80 |
| 2,930,162 | A * | 3/1960 | Mulford | 47/78 |
| 3,245,175 | A * | 4/1966 | Klingberg | 47/41.13 |
| 3,529,531 | A * | 9/1970 | Swett | 220/802 |
| D230,408 | S * | 2/1974 | Persson-Melin | D11/147 |
| D246,026 | S * | 10/1977 | Stahel | D7/388 |
| 4,328,641 | A * | 5/1982 | Tesch | 47/59 R |
| 4,860,491 | A * | 8/1989 | Panuski | 47/65.6 |
| 4,926,584 | A * | 5/1990 | Horibata | 47/59 R |
| 5,060,420 | A | 10/1991 | Bergman | |
| 5,097,627 | A | 3/1992 | Roberts | |
| 5,287,651 | A | 2/1994 | de Graaf | |
| 5,448,854 | A * | 9/1995 | Hirsch et al. | 47/65.6 |

(Continued)

FOREIGN PATENT DOCUMENTS

GB    8024238    * 10/1958

(Continued)

*Primary Examiner*—Peter M. Poon
*Assistant Examiner*—Kristen C Hayes
(74) *Attorney, Agent, or Firm*—Woods Rogers PLC; Peter E. Rosden

(57) ABSTRACT

A system and method for producing flowers and stems from flower bulbs and marketing them by securing a desired number of bulbs to a uniquely configured support device and causing the bulbs to develop roots and shoots. The support tray is then transferred and inserted into a transparent display container where the support device is elevated from the bottom of the container by a predetermined distance, and a nourishing liquid is added to the container. The combined display container and support device is then shipped either directly to retailers for sale.

3 Claims, 10 Drawing Sheets

U.S. PATENT DOCUMENTS

| | | | |
|---|---|---|---|
| D365,541 S * | 12/1995 | Hirsch et al. | D11/164 |
| 6,038,814 A * | 3/2000 | Miotto | 47/79 |
| 6,202,349 B1 | 3/2001 | Kanagawa et al. | |
| 6,401,386 B1 | 6/2002 | Ko | |
| 6,782,656 B2 | 8/2004 | Washburn | |
| 6,962,022 B2 * | 11/2005 | Shannon | 47/79 |

FOREIGN PATENT DOCUMENTS

NL 9301407 A * 3/1995

* cited by examiner

SYSTEM AND METHOD FOR DISPLAYING AND MARKETING INDOOR FLOWER BULBS

CROSS-REFERENCE TO RELATED APPLICATIONS

This application claims the benefit of U.S. provisional application Ser. No. 60/676763, filed May 2, 2005.

TECHNICAL FIELD

The subject invention relates generally to a simple, economical system and method for displaying and observing the growth of flower bulbs in an indoor environment. More particularly, this invention provides the basic items required to accomplish the aforementioned along with a method for marketing such a system.

BACKGROUND OF THE INVENTION

Displaying the transformation of flower bulbs into flowers in an indoor setting is a hobby and pleasure pursued by many people and businesses. Usually, one or more flower bulbs are sold to customers separately. Then, these customers must make their own arrangements to provide a nurturing growing environment for the bulbs by providing a dark and cool location in which to store the bulbs as well as soil and moisture to encourage the bulbs to begin sprouting and to set roots. Once this has occurred, the bulbs are typically transferred either to a planter or vase which has been suitably prepared with soil and nutrients to await the eventual appearance of flowers. These steps all require a considerable investment of time, money and space by the customer making the process unnecessarily inconvenient for the customer.

Variations on the described process have involved hydroponics arrangements, but such bulb treatments involve frequent adjustments of water levels and cultivation attention throughout. Some marketers have attempted to simplify the process by marketing plant bulbs in a prepared apparatus such as a bag devised for planting the bulb at a proper depth in soil and identifying the bulb type and color. This process also requires multiple steps be undertaken by the customer. An alternative planting approach requires that flower bulbs be placed in a series of pockets made from mineral wool felt which is open on one side. Here, again, the customer must perform multiple steps and purchase additional items to obtain flowers. It is also known to place multiple bulbs or seeds in wet soil in a growth tray stored in a cool environment and, once roots and shoots have appeared, to transfer the tray to soil to allow flowers to grow. Suggestions have even been made to place flower bulbs in a planting module which, once placed in soil and exposed to water, dissolves, permitting the bulb to sprout. Others have attempted to make the flower growing process easier by disclosing multi-function devices which can be used as both a flower vase and planting pot. The problem with the aforementioned approaches to flower and bulb cultivation is that either they require excessive work by the purchaser, do not permit observation of the flower growing process or mandate the use of soil and nutrient preparations by the customer to their great inconvenience. What is needed is a simple, inexpensive, convenient one-source system for growing and displaying flower bulbs which minimizes the purchaser's involvement and expenditure of time in the preparation and care of the flowers that ultimately emerge from the bulbs while maximizing the purchaser's enjoyment of the process.

SUMMARY OF THE INVENTION

The present invention relates to a system and method for displaying and marketing flower bulbs. The system includes a transparent, hollow display container with a top and a bottom having a uniform lateral cross sectional shape and uniform dimensions in a plane parallel to its base extending from its top to a predetermined distance from its bottom. A support device with a top surface and a bottom surface having a uniform lateral cross sectional shape duplicating that of said display container and uniform lateral cross sectional dimensions less than that of said display container bearing flower bulbs which have roots and shoots is designed for placement within the hollow display container. Flower bulbs are pressed base down in between spikes interspersed across one side of the support device so that the base of each bulb remains undamaged and each bulb is retained in place. When the desired number of bulbs has been placed onto the support device or the support device is full, the support device is placed in a rooting container, and a nourishing liquid such as water is added to the rooting container up to a level bringing the bottom of each bulb into contact with the liquid. The rooting container is then deposited into an appropriate environment, usually dark and cool, which encourages the growth of roots and sprouts in each bulb for a time period which varies with each bulb variety. Once such roots and sprouts have developed, the support device is transferred away from the rooting container and inserted down into the interior of the similarly shaped transparent, hollow display container until it encounters a shelf formed by an indentation running around the entire periphery of the wall of the display container. The support device is sized so that its periphery extends beyond the edge of the display container shelf and it will be supported by that shelf at a distance of at least one inch above the interior base of the display container. A quantity of nourishing liquid such as water is then added to the display container and runs through the perforations in the support device into the bottom of the display container up to a height approximately equivalent to the bottom of the bulbs on the support device and sufficient to completely bathe the roots extending downwardly from those bulbs. The display container is then wrapped and shipped to a purchaser or to a retailer for sale.

It is a primary object of this invention to provide a system and method enabling indoor cultivation of flower bulbs.

An additional object of this invention is to provide a simple, convenient system for consumers to participate in and enjoy watching the evolution of flower bulbs into flowers.

Another object of this invention is to provide a flower growing system which is immediately marketable upon receipt by vendors.

It is a further object of this invention to provide a system for growing flowers which continually changes in appearance as flowers develop from bulbs.

It is yet another object of this invention to provide a system which can be dismantled by purchasers and reused for the same purpose.

It is still another object of this invention to provide a system which can be dismantled by consumers and used for entirely different purposes.

Yet an additional object of this invention is to provide a system which enables simple cleaning of its component parts and replacement of cloudy liquids nourishing bulbs with new clear nourishing liquids.

It is another object of this invention to provide flower bulbs which can, once their initial blossom is spent, be planted in a garden in order to obtain further blossoms in the future.

Another object of this invention is to provide a system having economic incentives attractive to both consumers and retailers.

Still another object of this invention is to provide an educational tool for teaching how flowers grow and develop over time.

Yet another object of this invention is to provide a means for producing cut flowers having stronger blooms and stems than those available from greenhouses.

Still a further object of this invention is to provide an environmentally friendly means for growing flowers which does not require the expenditure of energy inherent when flowers are grown in greenhouses.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE PREFERRED EMBODIMENT

Figure 1:
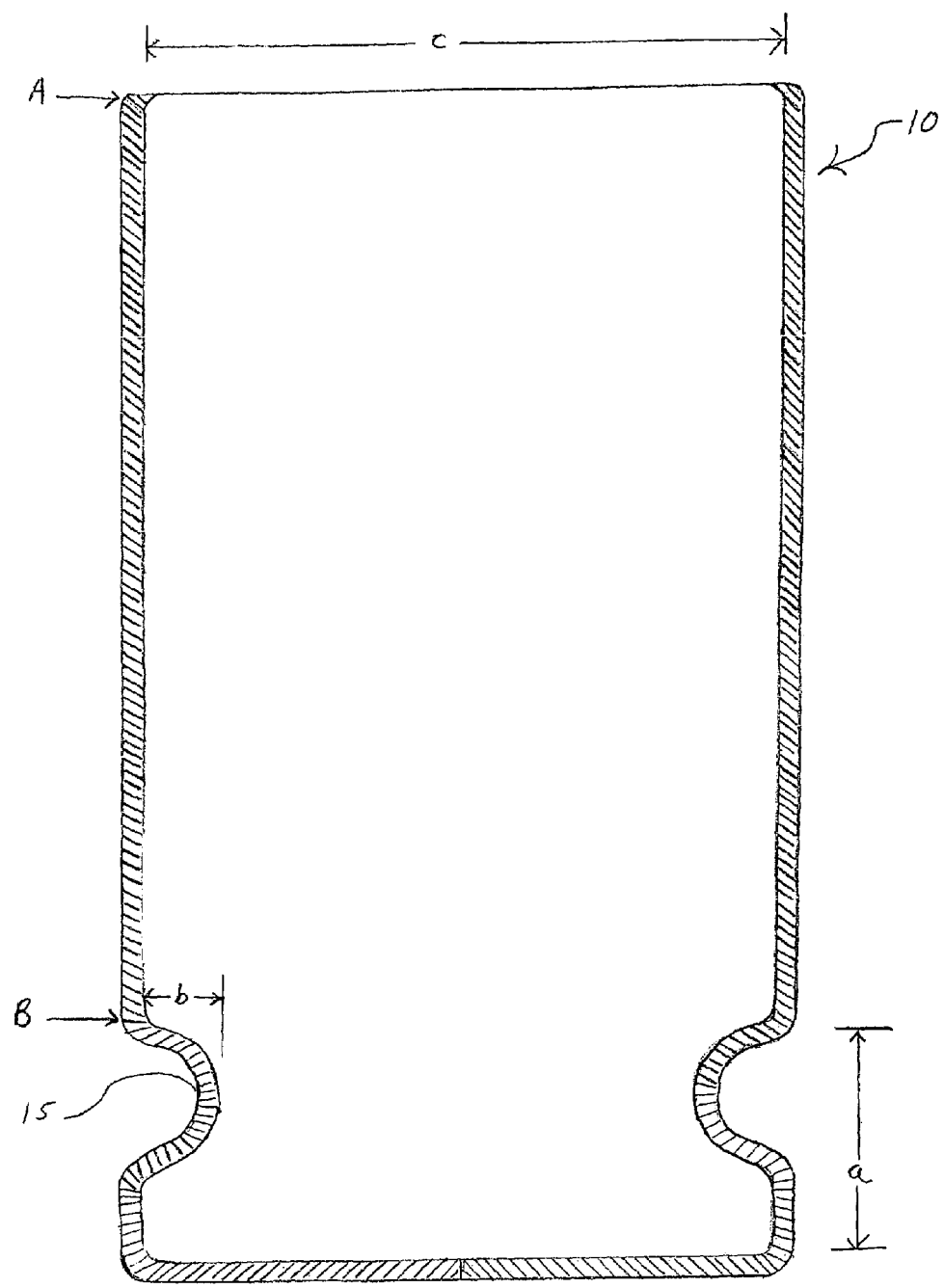
FIG. 1 is a cross-sectional view of the side of a display container appropriate for use with this invention.
Figure 2:
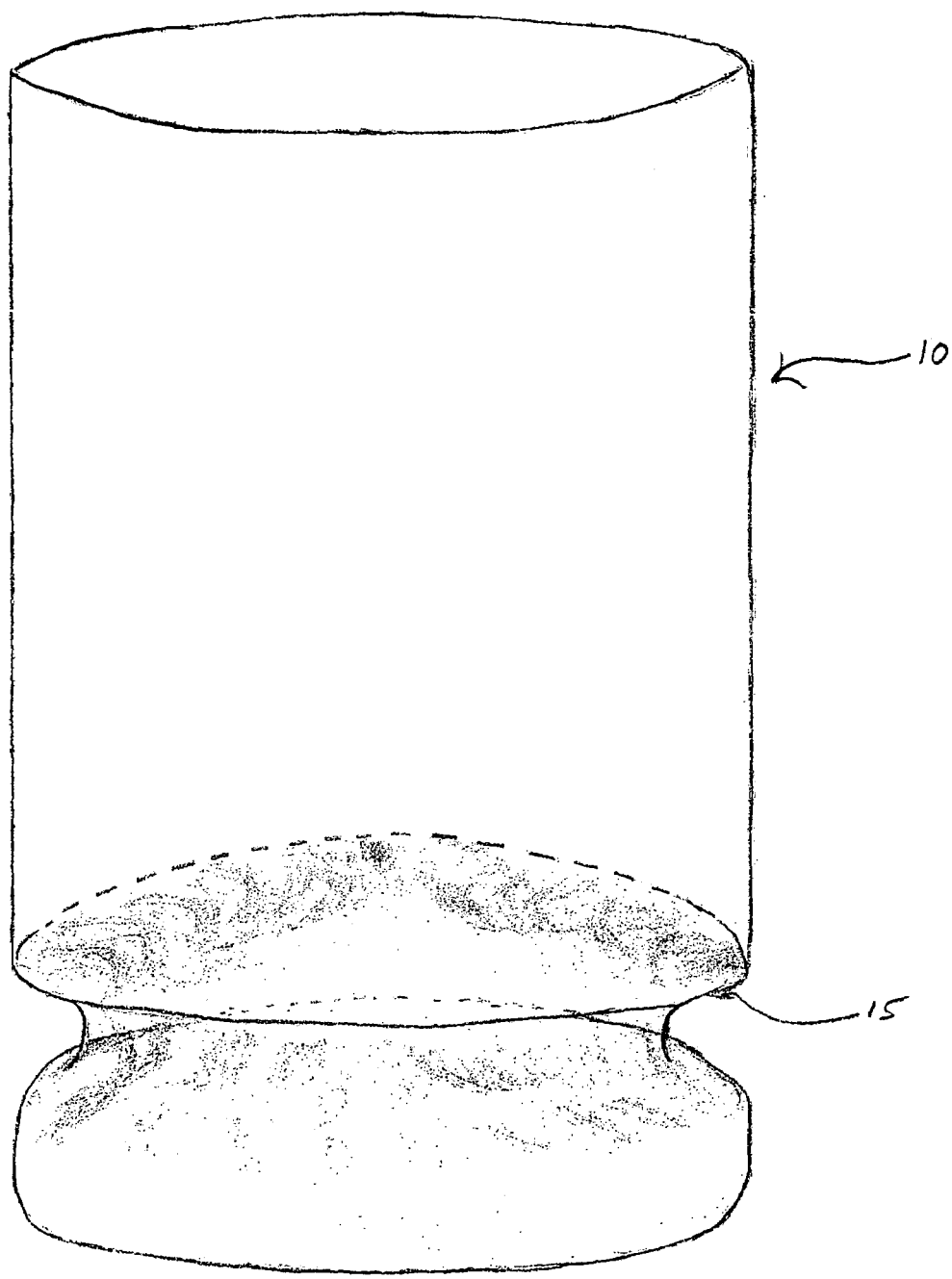
FIG. 2 is a perspective view of the display container of FIG. 1.

The system of this invention is comprised of a hollow display container, flower bulbs of one or more species, as desired, water placed in the bottom of the container which may be enhanced by the addition of nourishing and/or sustaining substances and a device for supporting the bulbs during the growing process. FIG. 1 presents a cross-sectional view of the side of display container 10 which is preferably made from a transparent material, such as, plastic or glass. In this way, the consumer or other user can observe the condition and level of the liquid within the container to determine when it needs to be changed and can also observe the transformation of the flower bulbs from their partially sprouted condition into fully grown flowers. Furthermore, light is required by the bulbs after they have produced roots in order for their growth process to develop a strong stem and blossom. The thickness of the material from which display container 10 is made can vary from approximately ⅛ inch to ⅜ inches. A smaller thickness provides a more delicate, aesthetically pleasing container but also one which is more prone to damage during shipment. A larger thickness is not as visually pleasing but is more damage resistant. Although the display container can be made in a variety of shapes, sizes and heights, its preferred shape is as shown in FIG. 1 in which display container 10 is cylindrical but includes a circular indentation shelf 15 at the bottom thereof beginning at a predetermined distance of approximately "a" which is at least one inch from the interior of the surface of its base to the beginning of the indentation for shelf 15 and extending inwardly from its inner wall a distance of approximately "b" which is the width of shelf 15. However, typically the height of the display container does not exceed the likely height of the flowers sprouting from the bulbs. Distance "b" is determined based on aesthetics, the dimensions of display container 10 and the size of the support tray, described below. Furthermore, the preferred embodiment of display container 10 must have a uniform lateral cross sectional shape in a plane parallel to its base from its top down to the predetermined distance "a" from its bottom. In FIG. 1, that uniformity extends from the top of display container 10 at "A" down to point "B" where the indentation for shelf 15 begins, resulting in the cross sectional shape being circular. Other geometric or asymmetrical shapes for container 10 may be used so long as there is cross sectional uniformity, as previously described. FIG. 2 shows a perspective view of a display container suitable for use in the preferred embodiment of this invention.

Figure 3:
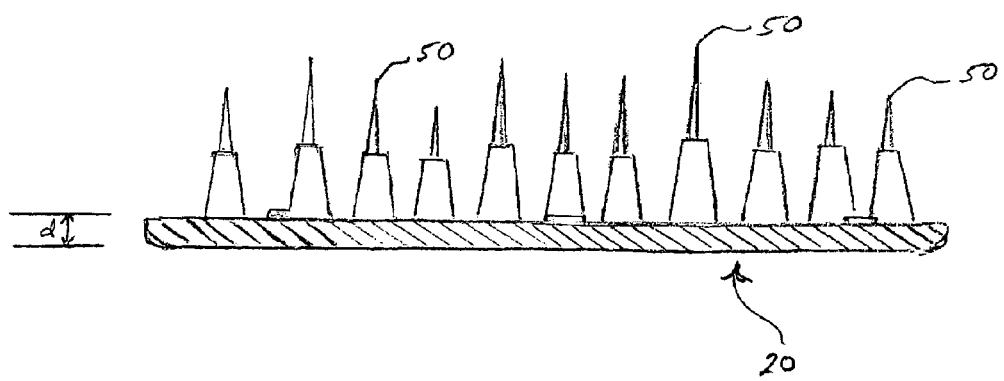
FIG. 3 is a cross-sectional view of a support device appropriate for use with this invention.
Figure 4:
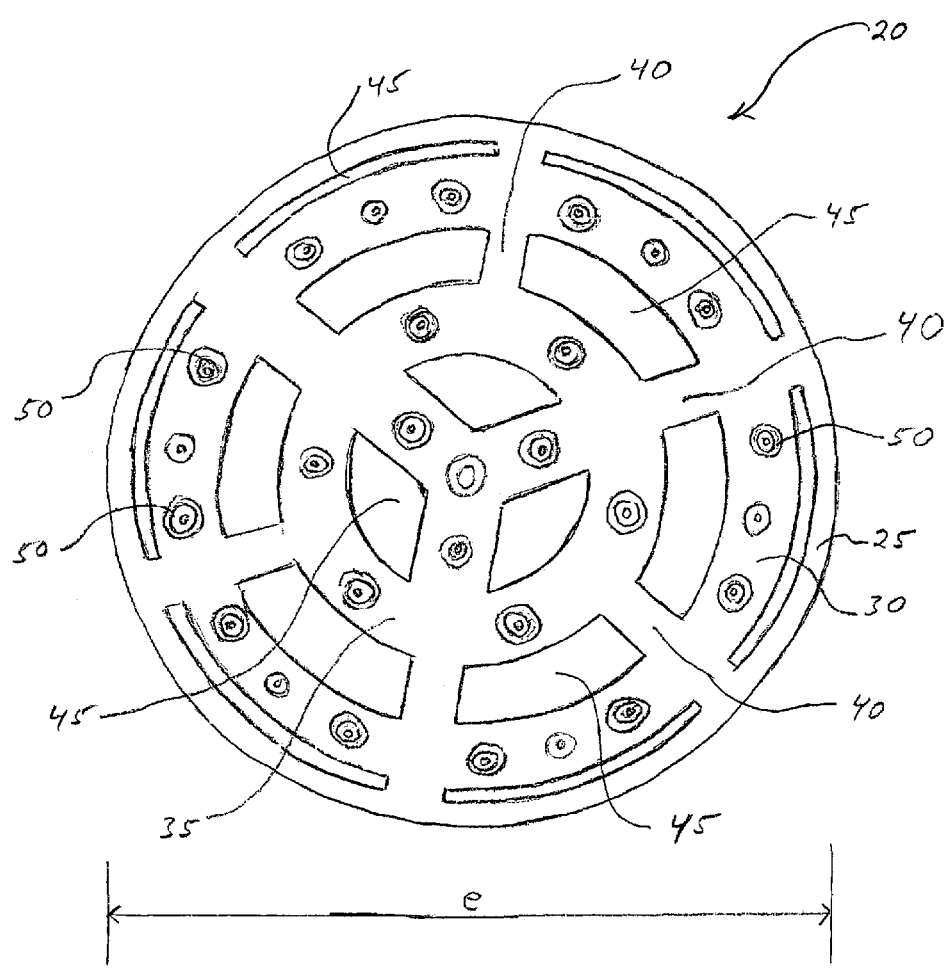
FIG. 4 is an overhead view of the support device of FIG. 3.
Figure 5:
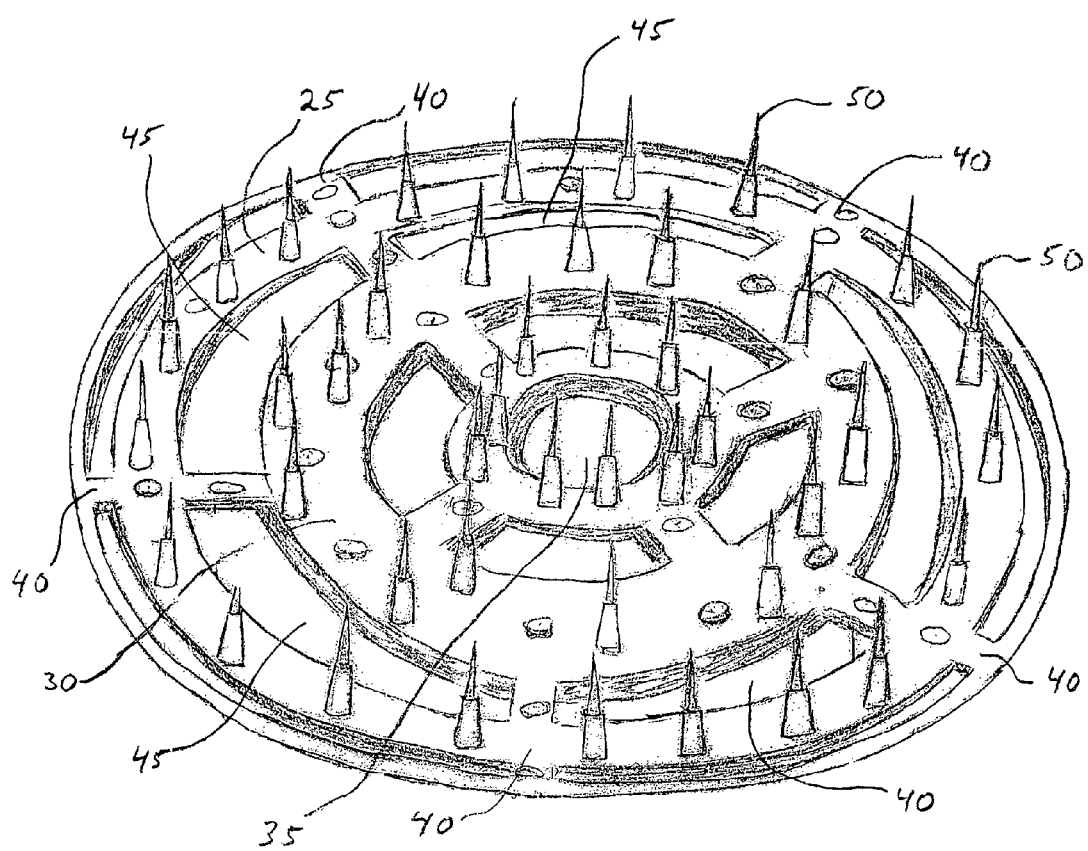
FIG. 5 is a perspective view of a support device of FIG. 3.
Figure 6:
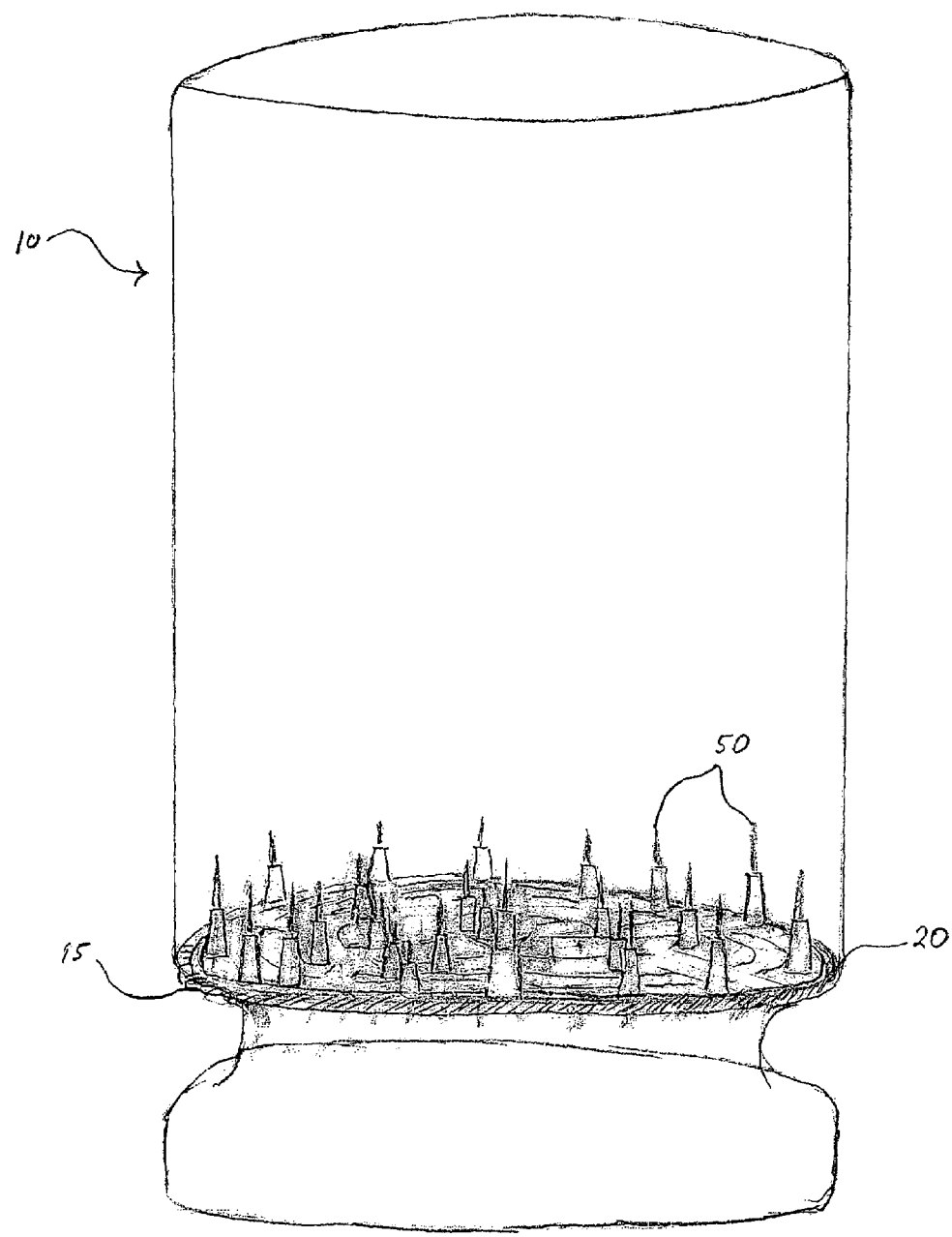
FIG. 6 is a perspective view of a display container into which a support device has been placed.

FIGS. 3, 4 and 5 show, respectively a cross-sectional side view, an overhead view and a perspective view of first support device 20 for use with display container 10. Device 20 in the preferred embodiment must have a lateral cross sectional shape which duplicates the lateral cross sectional shape described above for display container 10. For the cylindrical container shown in the figures herein, that shape would be circular, as shown in FIG. 4. Support device 20 is a unitary body which may be formed from plastic using, for example, a mold, although other materials than plastic may be used. A clear or translucent material for support device 20 is preferred to permit light to be transmitted to all parts of the bulbs placed on support device 20, as described below, and to permit purchasers to more clearly view the transformation of the flower bulbs as roots and flowers develop over time. A colored or dark material may also be used to form support device 20 without materially impacting the bulb growth process although such a material may detract from the visual impression made by enabling a full view of flower bulbs which have been placed on device 20. However, use of a contrasting color for device 20 does have the advantage of making the spikes more visible thereby reducing the chance of injury when placing bulbs onto device 20 during assembly, as described below. In the preferred embodiment, support device 20 is further comprised of a series of successively smaller, concentric, circular surfaces 25, 30 and 35, each of which is in the same plane as, but spaced apart from, adjacent circular surfaces. The circular surfaces are interconnected by spokes 40 creating the appearance of a number of interlinked segments with open spaces or perforations 45 between them. These perforations extend entirely through device 20 and permit the nourishing liquid to pass through device 20 and to bathe both the bottom of the bulbs and their roots, as described below. The nourishing liquid may be water alone or water combined with additives to control one or more of the pH and the mineral value, or EC, of the liquid along with fertilizer to enhance growth. The perforations in device 20 need not result from the incorporation of concentric circular surfaces during formation. Other kinds of configurations such as, for example, concentric triangles or asymmetric shapes, may be used so long as perforations are provided at intervals throughout device 20. Each segment includes one or more spikes 50 which project upwardly in the same direction from the same side of all of the circular surfaces forming approximately a 90 degree angle with each such surface. The number of spikes 50 on any circular surface depends on the overall size of support device 20 which, in turn, depends on the configuration of display container 10. The exterior diameter "e" of support device 20 in FIG. 4 is less than the interior wall diameter "c" of display container 10, but greater than "c" minus "b". This configuration enables support device 20 to fit inside of display container 10 and, due to the uniform lateral cross sectional configuration of display container 10, to slide down freely until it comes into contact with indentation 15 which forms a shelf on which support device 20 rests as shown in FIG. 6. The important point in this regard is that support device 20 should not be so small as to permit it to flip over when dropped into display container 10. This same relationship between the configurations of display container 10 and support device 20 exists regardless of the shape of display container 10. The thickness "d" of device 20, as shown in FIG. 3, is typically approximately ⅜ inches, although this measurement is not critical so long as device 20 does not become brittle or breakable due to being made too thin. Although display container 10 may be made in different shapes, in the preferred embodiment, it always includes an indentation 15 and support device 20 mirrors the cross-sectional shape of display container 10 as viewed from above and having dimensions such that it fits inside of display container 10 and rests on indentation 15. Thus, a cylindrical vase requires a round support device; a square vase requires a square support device, and so forth.

Figure 7:
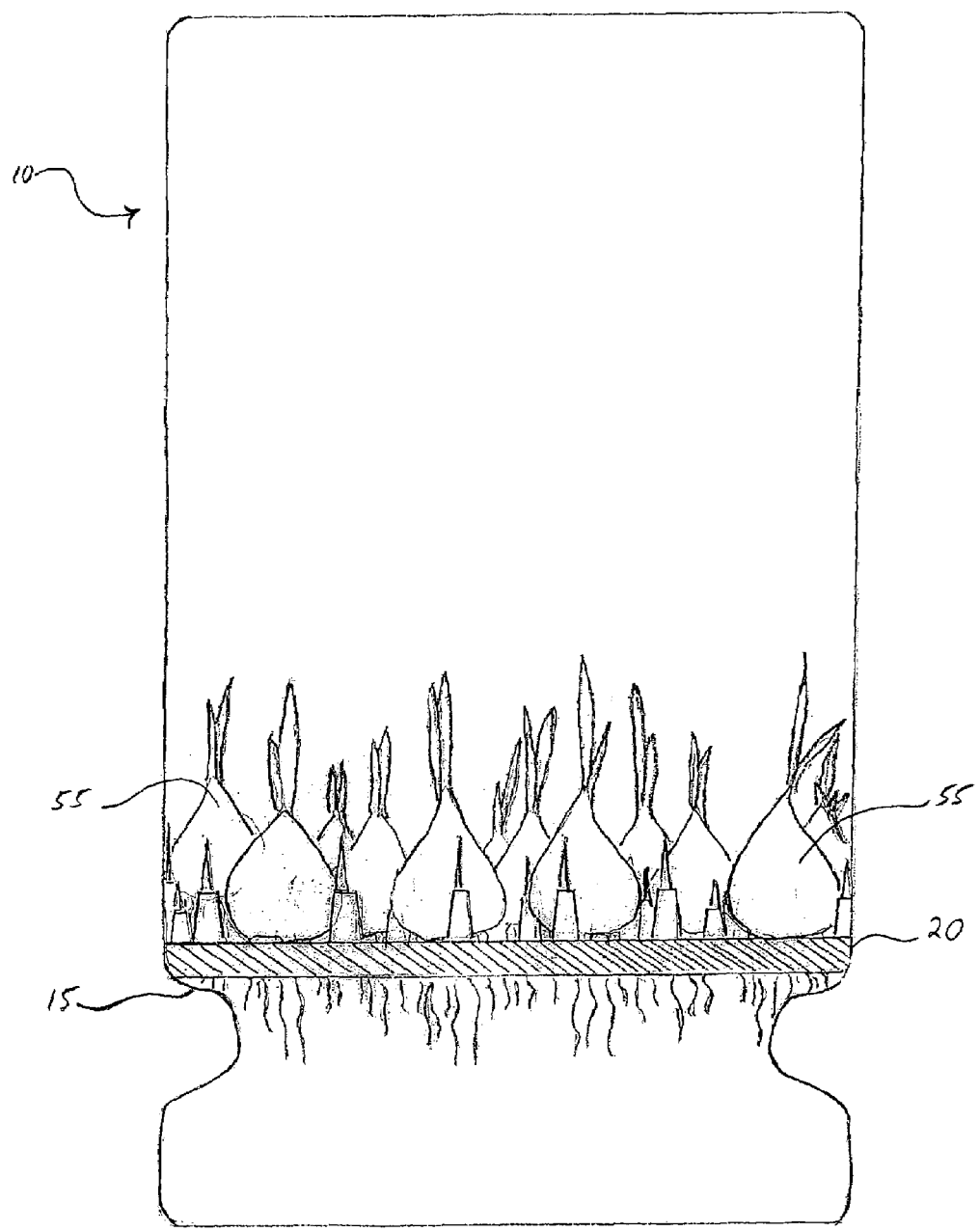
FIG. 7 is a perspective view of a display container housing a support device bearing flower bulbs.
Figure 8:
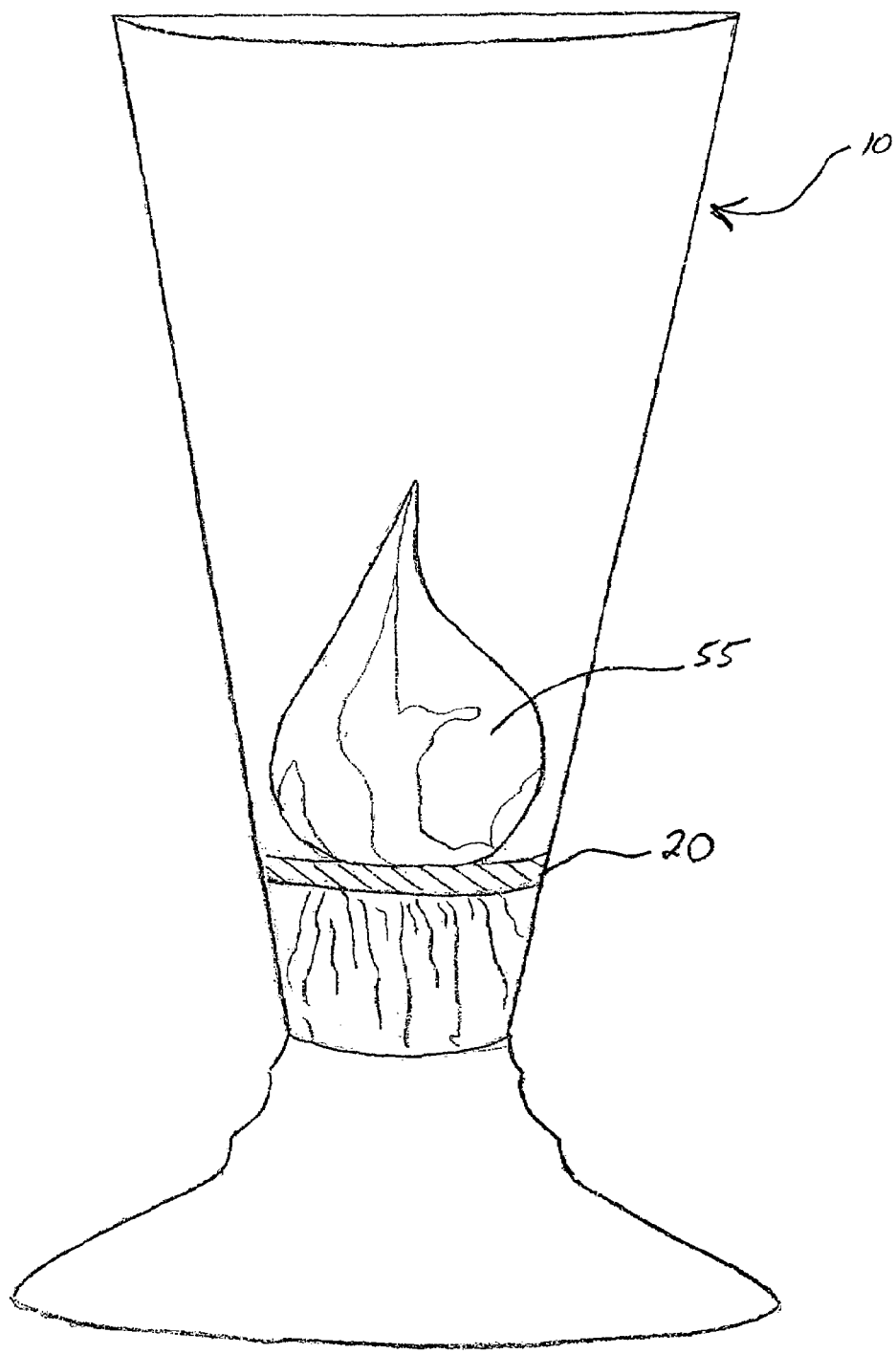
FIG. 8 is a perspective view of a conically shaped display container.

Support device 20 functions to secure flower bulbs in place initially while the bulbs develop roots and, subsequently, while flowers grow from those bulbs. Typically, the display container and support device are configured such that a multiplicity of bulbs may be secured onto each support device. FIG. 7 presents a perspective view of a display container housing a plurality of bulbs secured on a support device. However, an alternative support device could be small enough to fit within the bottom of a conical display container with only one flower bulb positioned on the support device. In this case, there would be no necessity for indentation 15 since the inward sloping walls of the display container would themselves eventually narrow so much that they would prevent the support device from falling lower down into the display container. FIG. 8 illustrates such a configuration. A variety of other support devices may be used including, for example, marbles placed at the bottom of the display container or a foam board with holes cut therein each of which is small enough to support a bulb without letting it slip through the hole so long as the bulb is kept in an upright position and the material used is nonsoluble in water. Regardless of the support device used, after insertion into the display container, the bulbs must be positioned such that sufficient space remains beneath the bulbs at the bottom of the display container for the base of each bulb to be in contact with the liquid added to the container while the tip of each bulb faces upwards outside of contact with the liquid. In addition, enough space must remain beneath the bulb for bulb roots to develop and continue to grow.

Figure 9:
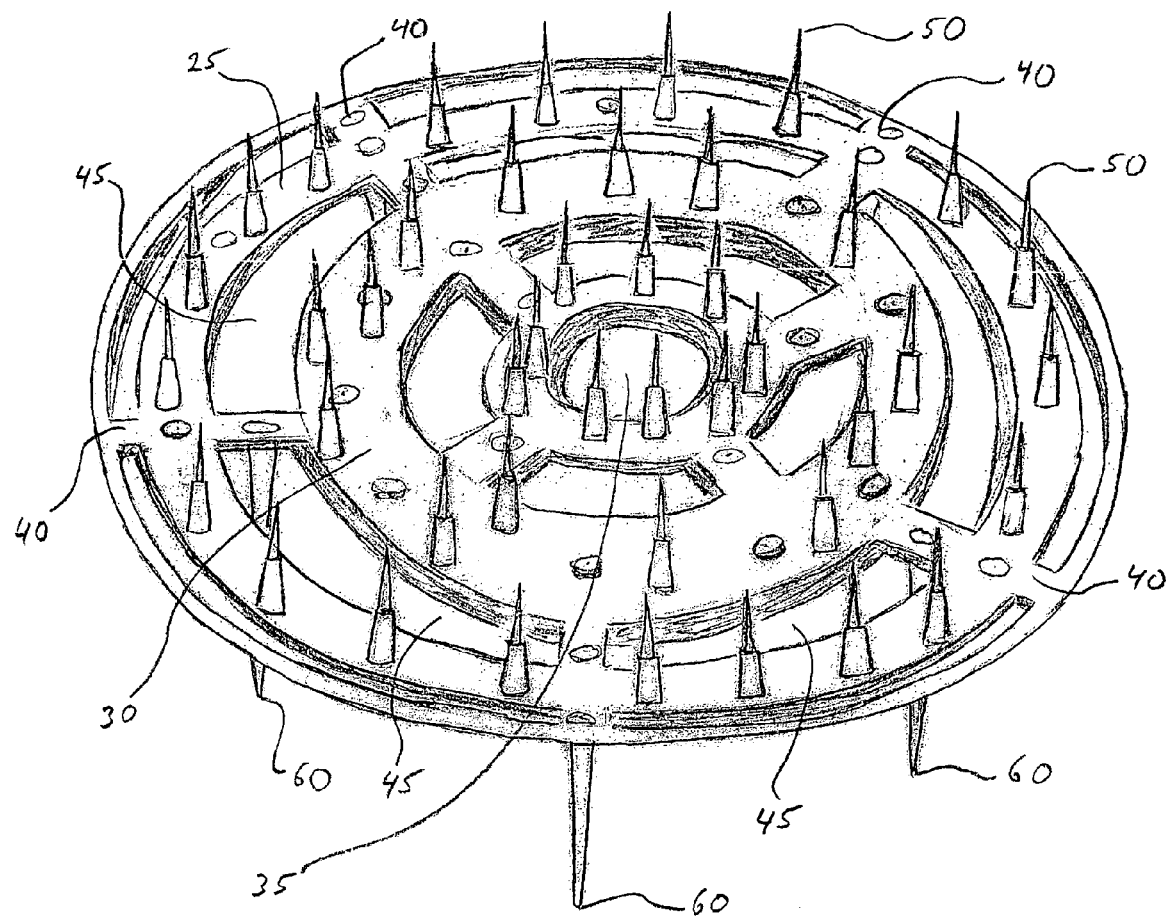
FIG. 9 is a perspective view of an alternate embodiment of a support device.
Figure 10:
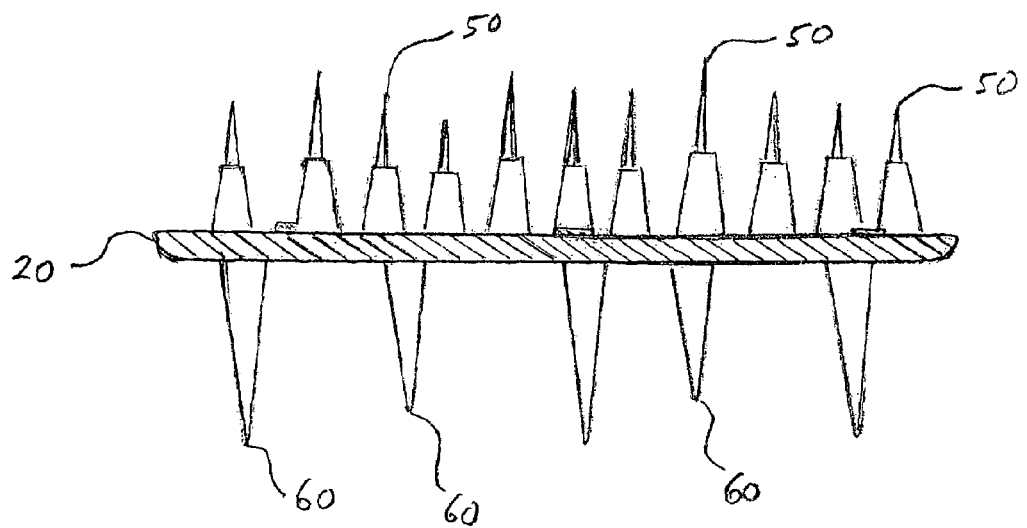
FIG. 10 is a cross-sectional view of the side of the support device of FIG. 9.

An alternate configuration for support device 20 would be as shown in the perspective view provided by FIG. 9 where several support legs 60 extend downwardly in a direction opposite from spikes 50. Support legs 60 may themselves be formed as spikes or may take any other desired shape. A sufficient number of legs 60 must be provided to provide stability to support device 20. Depending on the size and shape of support device 20, such stability would require at least three legs 60 although a greater number may be used. The purpose of this configuration is to permit the use of a type of support device 20 in a display container 10 which does not include indentation shelf 15 but, instead, has a smooth, flat, uniform interior surface such as a uniformly dimensional hollow cylinder or a uniformly dimensional hollow square from top to bottom. Legs 60 extend approximately 1 to 2 inches away from the bottom of support device 20 and serve to replace the function of indentation shelf 15 by displacing support device 20 from the bottom of display container 10 sufficiently for roots to grow from bulbs 55 and for nourishing liquid to bathe the bottom of bulbs 55. FIG. 10 is a cross-sectional view of alternative support device 20.

The method for preparing this product for marketing involves the following steps. A display container of the desired shape and size is chosen. Then, a matching support device which will fit inside of the chosen display container is selected. Support device 20 is placed on a generally flat-surfaced, second support. This second support is comprised of a surface which is approximately parallel to but raised approximately 1 to 2 inches above ground level. The second support has a plurality of open spaces and can, for example, be a grill or wire mesh configuration or any other arrangement which provides a means to raise support device 20 while only maintaining partial physical contact with one side thereof. First support device 20 is placed on the second support with spikes 50 positioned perpendicular to and pointing away from the ground. The bulb or bulbs 55 to be associated with first support device 20 are chosen and each of them is pressed downward in between at least two spikes 50 so that the base of each bulb remains unharmed. Thereby, at least two spikes 50 pierce the outside periphery of each bulb 55 providing a rigid support for each such bulb. When the desired number of bulbs 55 has been so placed onto support device 20 or there are no more spikes between which bulbs may be pressed and still reside within the periphery of support device 20, the combination of support device 20 and second support 55 is placed into a rooting container having a tray-like configuration into which a cold tap water with which nourishing substances may be mixed is added to a level bringing the liquid into contact with the bottom of each bulb 55 situated on first support device 20. These steps are repeated until the rooting container is full. The second support may also be integrated into the rooting container by, for example, incorporating several spaced apart, opposing, zigzag, raised areas with outwardly slanting sidewalls into the bottom of the rooting container. One or more first support devices 20 can then be placed directly between these raised areas at the bottom of the rooting container and will be held above the bottom of the rooting container due to the slanting sidewalls of the raised areas. Note that the order in which the steps previously outlined are performed may be varied. Alternatively, for example, a rooting container may be filled with one or more second supports or may incorporate second supports into its structure, and then the first support devices 20 may be placed on top of second supports and bulbs 55 may be positioned therein at that time. Nourishing liquid may be added at any time during the process. The rooting container is then kept at the temperature and humidity and for the time period required for the particular bulb species to grow roots and sprouts and may, in addition, be kept in a dark environment if such is favorable for the growth of bulb roots and sprouts. Once a plurality of such roots and sprouts have developed, first support device 20 is removed from the rooting container and inserted into the appropriate display container 10 and sufficient cold nourishing liquid is added to a height which just covers the base of the bulbs.

Next, display container 10 is prepared for shipping to a retailer. Preparation may take several forms. The display container may be placed into a rigid or semi-rigid display box having a size larger than the display container and a multi-cornered configuration, such as a square, in order to protect the display container and to minimize the chance that the display container will fall over or that liquid will spill from the container during shipping. This display box may then be packaged together with other display containers in a shipping box. Alternatively, one or more display containers may each be wrapped in bubble wrap and placed in a vented shipping box for shipment. Spillage during shipment is prevented by using a display container which is tall enough to minimize the chance of spillage and by clearly marking the shipping box with the position in which the box must be placed during shipment, i.e. with the display containers upright. The hydroponics aspect of this invention is important since it is already well-known to sell bulbs in containers together with soil. Another important aspect of this invention is that by raising flowers using the method of this invention much stronger and longer lasting blooms and stems are obtained than result from flowers emerging from bulbs resting only in soil. The reason behind this result is that bulbs in soil are inconsistently exposed to moisture and can become intermittently dry thereby weakening the blossoms and stems whereas the moisture exposure of all bulbs treated as disclosed by this invention can be easily visually monitored and adjusted at any time due to the use of the transparent display container.

The protected display container may then be shipped to retail outlets for ultimate sales to consumers. Not only is this product marketable to consumers from the moment it arrives at retailers, its appearance varies over time as the shoots grow and eventually blossom to produce a marketing lure at the retail point of sale. Consequently, this system not only enhances the enjoyment of its purchasers, it also has educational uses in that students can advance their knowledge of botany by studying exactly how flowers grow and develop and by observing changes through the transparent display container. This system also enables consumers to grow tulips and other varieties of flower bulbs in an indoor environment which has previously been considered an excessively difficult and/or complex endeavor. After flowers have actually blossomed, this system has the added advantage of providing an easy method to change the liquid which may become cloudy and unattractive over time. The user may grasp the display container with one hand and some or all of the flowers simultaneously with the other hand at a point on the stem(s) of the flower(s) accessible at or above the upper lip of the display container and tip or invert the display container in order to drain the liquid within the display container. Upon replacement, rearrangement of the flowers is unnecessary as they are kept in place by the spikes on the tray. This ability to refresh the liquid nourishing the bulbs also enhances the life of the flowers produced by the system. Similarly, the flowers and support device can be removed from the display container to facilitate cleaning of the display container. When the flowers are eventually disposed of, an added advantage of the system of this invention is that the consumer may elect either to retain either or both the display container and support device for reuse in a similar manner after purchase of new bulbs or to dispose of the spent bulbs and support device while reusing the display container for another purpose such as a normal flower vase or a hurricane lamp. The consumer also has the option once the flowers have died down to remove the bulbs from the support device and plant them in their garden in order to obtain further blossoms at a future time. Furthermore, the system is relatively inexpensive to produce and can, therefore, be marketed at a very affordable price. In addition, since the flowers and stems resulting from use of this invention are superior to those from bulbs raised in greenhouses, widespread use will result in a decreased demand for greenhouse raised flowers and, hence, have a desirable environmental effect of reducing the energy requirements related to operating greenhouses. All of the foregoing provide economic incentives to the consumer motivating sales of this system and therefore making it simultaneously more attractive to retailers.

Although various elements in the previously described embodiments of this invention have been disclosed with reference to particular types of materials and particular sequences of steps, it should be understood that the functions performed by these materials may also be performed in appropriate cases by other types of materials and that this invention is not limited by reference to the specific materials disclosed. Furthermore, the process steps disclosed are not the only way in which the function of this invention can be implemented. Other embodiments and sequences of steps are possible so long as the functions and advantages described above are preserved.

What is claimed is:

1. A hydroponic system for displaying and marketing tulip bulbs comprised of:
    a transparent, hollow display vase with a top, side walls and a bottom having a uniform lateral cross sectional shape, uniform dimensions in a plane parallel to its base from its top to a predetermined distance from its bottom and a shelf formed by a uniform indentation extending throughout the side walls thereof beginning at the predetermined distance from its bottom and extending entirely around the periphery of said vase;
    a single piece, single tier support device with a top surface and a bottom surface, said support device having a uniform lateral cross sectional shape duplicating that of said vase, uniform lateral cross sectional dimensions less than that of said vase and a plurality of spikes perpendicular to and spaced apart across the top surface thereof retaining tulip bulbs therebetween each having an upper tip portion, a lower base portion and roots extending away from the lower base portion and each bulb held in place solely by said support device and contacting said top surface thereof, with the lower base portion thereof facing down throughout rooting, growth and blossoming, said support device keeping the tulip bulbs within said vase at the height of the shelf formed within said vase being supported at the periphery of its bottom surface by the shelf wherein the uniform lateral cross sectional dimensions of said support device are small enough to permit friction free insertion into the hollow space within said vase but large enough to be retained within said vase by the shelf and wherein further said support device includes a plurality of perforations distributed across the top surface thereof and extending entirely therethrough; and
    a predetermined amount of nourishing liquid in the bottom of said vase filling said vase from the bottom thereof to completely bathe the roots of the tulip bulbs.

2. The system of claim 1 wherein said support device is either transparent or translucent.

3. The system of claim 1 wherein the predetermined distance equals at least one inch.

* * * * *